(12) United States Patent
Sahin

(10) Patent No.: US 10,125,747 B2
(45) Date of Patent: Nov. 13, 2018

(54) BACTERIAL SPORE BASED ENERGY SYSTEM

(71) Applicant: PRESIDENT AND FELLOWS OF HARVARD COLLEGE, Cambridge, MA (US)

(72) Inventor: Ozgur Sahin, New York, NY (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 317 days.

(21) Appl. No.: 14/959,640

(22) Filed: Dec. 4, 2015

(65) Prior Publication Data

US 2017/0067452 A1 Mar. 9, 2017

Related U.S. Application Data

(62) Division of application No. 13/988,857, filed as application No. PCT/US2011/061869 on Nov. 22, 2011, now Pat. No. 9,234,508.

(Continued)

(51) Int. Cl.
*H01L 41/08* (2006.01)
*F03G 7/00* (2006.01)
(Continued)

(52) U.S. Cl.
CPC ............ *F03G 7/005* (2013.01); *F03G 7/06* (2013.01); *H01G 5/16* (2013.01); *H02K 7/18* (2013.01); *H02N 1/08* (2013.01); *H02N 2/18* (2013.01)

(58) Field of Classification Search
CPC ............. H02N 2/18; F03G 7/005; H02K 7/18
(Continued)

(56) References Cited

U.S. PATENT DOCUMENTS 4,682,502 A 7/1987 Miyoshi et al.
5,302,270 A * 4/1994 Yamauchi ............ B01D 53/326
 204/252

(Continued)

FOREIGN PATENT DOCUMENTS

EP 0811838 A1 12/1997
JP 2005304212 A 10/2005

(Continued)

OTHER PUBLICATIONS

Agnarsson et al., "Spider silk as a novel high performance biomimetic muscle driven by humidity", The Journal of Experimental Biology, 212:1990-1994 (2009).

(Continued)

*Primary Examiner* — J. San Martin
(74) *Attorney, Agent, or Firm* — Nixon Peabody LLP; David S. Resnick

(57) ABSTRACT

A method and system for providing an engine for producing mechanical energy through the absorption and evaporation of moisture uses a hygroscopic material in one or more configurations to do mechanical work. The hygroscopic material can include microbial spores, plant cells and cell materials, silk and hydrogel materials that absorb moisture and expand or swell when exposed to high relative humidity environments and shrink or return to nearly their original size or shape when exposed to low relative humidity environments wherein the moisture evaporates and is released. By exposing the hygroscopic material to a cycle of high relative humidity environments and low relative humidity environments, useful work can be done. One or more transmission elements can be used to couple the hygroscopic material to a generator that converts the mechanical energy to, for example, electrical energy. The hygroscopic material can be applied to flexible sheet materials that flex as the hygroscopic material absorbs or evaporates moisture. The (Continued)

hygroscopic material can also be applied to elastic conductive materials, such that the plates of a capacitor mechanically change the capacitance of the device.

18 Claims, 17 Drawing Sheets

Related U.S. Application Data

(60) Provisional application No. 61/415,902, filed on Nov. 22, 2010.

(51) Int. Cl.
  H02N 2/18     (2006.01)
  F03G 7/06     (2006.01)
  H01G 5/16     (2006.01)
  H02K 7/18     (2006.01)
  H02N 1/08     (2006.01)

(58) Field of Classification Search
  USPC ......................................................... 310/339
  See application file for complete search history.

(56) References Cited

U.S. PATENT DOCUMENTS

| | | | |
|---|---|---|---|
| 7,385,336 B2 | 6/2008 | Uphoff | |
| 2004/0217672 A1 | 11/2004 | Bindig et al. | |
| 2006/0261709 A1* | 11/2006 | Kato | A61B 1/0051 310/367 |
| 2008/0034750 A1 | 2/2008 | Gao et al. | |
| 2009/0047489 A1 | 2/2009 | Grummon et al. | |
| 2011/0030275 A1 | 2/2011 | Brown | |
| 2013/0095400 A1* | 4/2013 | Lundblad | F16K 99/0005 429/422 |
| 2015/0167184 A1* | 6/2015 | Abhishek | C25B 9/063 204/268 |
| 2016/0036353 A1* | 2/2016 | Stasik | F03G 7/005 318/116 |
| 2017/0051728 A1* | 2/2017 | Chen | F03G 7/005 |

FOREIGN PATENT DOCUMENTS

| | | | | |
|---|---|---|---|---|
| JP | 2010193534 A | 9/2010 | | |
| JP | 2010261766 A | 11/2010 | | |
| WO | WO 2012047682 A2 * | 4/2012 | | H01L 41/193 |
| WO | WO 2015172067 A1 * | 11/2015 | | F03G 7/005 |

OTHER PUBLICATIONS

Borno et al., "Charge-pumping in a synthetic leaf for harvesting energy from evaporation-driven flows", Applied Physics Letters, 95:013705 (2009).
Carrera et al., "Wet and dry density of Bacillus anthracis and other Bacillus species", Journal of Applied Microbiology, 105:68-77 (2008).
Elbaum et al., "The Role of Wheat Awns in the Seed Dispersal Unit", Science, 316:884-886 with Online Supporting Material (2007).
Johnson, "Dielectric Elastomers", AE 510: Research Project Presentation, Oct. 22, 2002.
Koh et al., "Maximal energy that can be converted by a dielectric elastomer generator", Applied Physics Letters, 94:262902-1 (2009).
Kornbluh, "Power from Plastic: How Electroactive Polymer 'Artificial Muscles' will Improve Portable Power Generation in the 21st Century Military", SRI International, 2003, Tri Service Power Expo—Norfolk, VA.
Pelrine et al., "Recent Progress in Heel-Strike Generators Using Electroactive Polymers", accessed Jun. 19, 2013, http://www54.homepage.villanova.edu/michael.erwin/Research%20Papers/5sri.pdf.
Reyssat et al., Hygromorphs: from pine cones to biomimetic bilayers, J.R. Soc. Interface, doi:10.1098/rsif.2009.0184, published online (2009).
Starner et al., "Human Generated Power for Mobile Electronics", accessed Jun. 19, 2013, http://www.cc.gatech.edu/~thad/p/books/human-generated-power-for-mobile-electronics.pdf, to appear in Piguet, C. (ed), Low Power Electronics Design, CRC Press, Fall 2004.
Suo, "Theory of Dielectric Elastomers", Ada Mechanica Salida Sinica, 23(6):549-578 (2010).
Tisa et al., "Wet and Dry Bacterial Spore Densities Determined by Buoyant Sedimentation", Applied and Environmental Microbiology, 43(6)1301-1310 (1982).
Wheeler et al., "The transpiration of water at negative pressures in a synthetic tree", Nature, 455:208-212 (2008).
Driks et al., "Subcellular localization of proteins involved in the assembly of the spore coat of Bacillus subtilis", Genes Dev 8(2) 234-244 (1994).
Driks et al., "The dynamic spore", Proc Natl Acad Sci USA 100(6) 3007-3010 (2003).
Nicholson et al., "Resistance of Bacillus endospores to extreme terrestrial and extraterrestrial environments", Microbiol MOI Biol Rev 64(3) 548-572 (2000).
Penman, "Natural evaporation from open water, bare soil and grass", Proc R Soc Lond A Math Phys Sci 193(1032) 120-145 (1948).
Plomp et al., "The high-resolution architecture and structural dynamics of Bacillus spores", Biophys J 88(1) 603-608 (2005).
Westphal et al., "Kinetics of size changes of individual Bacillus thuringiensis spores in response to changes in relative humidity", Proc Natl Acad Sci USA 100(6) 3461-3466 (2003).

* cited by examiner

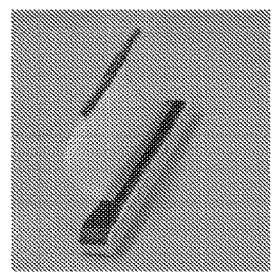
FIG. 4A
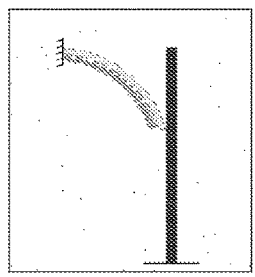
FIG. 4B
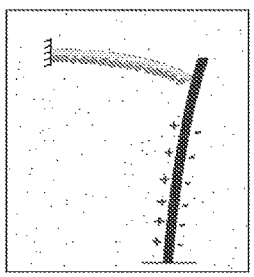
FIG. 4C
FIG. 4D
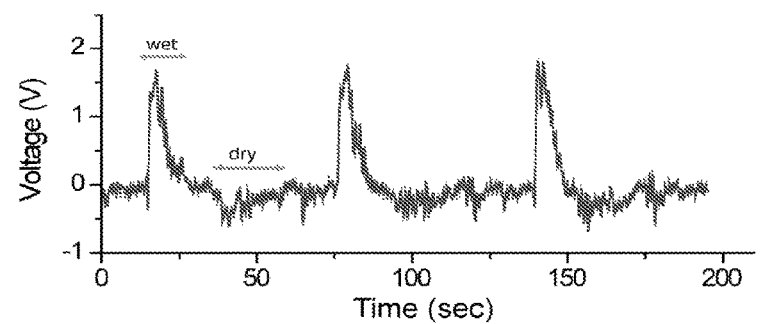
FIG. 4E
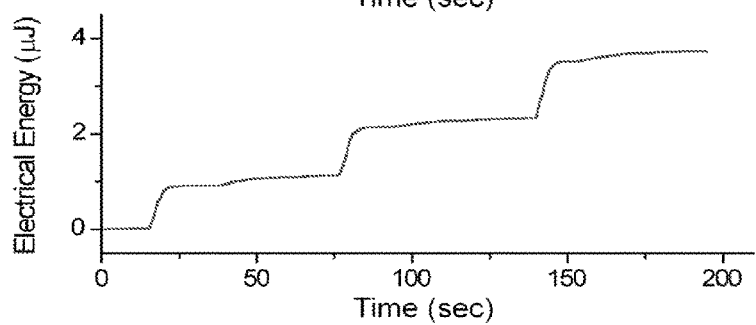

BACTERIAL SPORE BASED ENERGY SYSTEM

CROSS-REFERENCE TO RELATED APPLICATIONS

This application is a divisional application of U.S. application Ser. No. 13/998,857 filed Jul. 23, 2013 which is a 35 U.S.C. § 371 National Phase Entry Application of International Application No. PCT/US2011/061869 filed Nov. 22, 2011, which designates the U.S., and which claims any and all benefits under 35 U.S.C. § 119(e) of U.S. Provisional Application No. 61/415,902 filed Nov. 22, 2010, the contents of which are incorporated herein by reference in their entireties.

STATEMENT REGARDING FEDERALLY SPONSORED RESEARCH

Not Applicable

REFERENCE TO MICROFICHE APPENDIX

Not Applicable

BACKGROUND

Technical Field of the Invention

The present invention relates to systems that can store and release energy using hygroscopic materials. Specifically, systems based on hygroscopic materials can be selectively exposed to high or low humidity environments in order to cause the materials to expand or contract to do useful work as well as store and release energy.

Description of the Prior Art

Natural evaporation across open water facilitates the energy exchange between oceans and atmosphere, thereby fueling the winds and warm weather on earth. Under dry atmospheric conditions evaporation can be harnessed to do useful work, for example, the tree uses evaporation to transport water from soil to the leaves. Plants also use swelling and shrinking of cell walls for mechanical actuation. These processes have inspired novel approaches to engineering actuators, pumps, biological sensors and even energy scavengers to power micro- and nano-devices. In principle, evaporation has the potential to become a significant source of renewable energy. However, this requires useful work to be generated from evaporation with high efficiency, high power levels, long term sustained performance, and without consuming fresh water.

Bacterial spores are dormant cells that can withstand harsh environmental conditions for long periods of time and still maintain biological functionality (FIG. 1a). Despite their dormancy, spores are remarkably dynamic structures. For example, *Bacillus* spores respond to changes in relative humidity (RH) by expanding and shrinking anisotropically and changing their diameter by as much as 12% (FIG. 1b). The density of fully hydrated and expanded spores are significantly lower than dry spores; ~1.2 g/ml vs. ~1.5 g/ml for *B. subtilis*. The reduction of mass density despite absorption of additional material requires spores to expand their volume highly efficiently.

SUMMARY

The striking durability, dynamic response, and efficient use of water have motivated us to investigate their use in energy conversion from natural absorption and evaporation. In accordance with the invention, the swelling-shrinking cycle of microbial spores, such as bacterial spores, shows promise for economically feasible generation of renewable energy from natural evaporation. These and other hygroscopic materials, such as mutant spores, plant cells and plant cell materials, and silk can be used to store and generate energy.

In accordance with various embodiments of the invention, the hygroscopic material can be coupled to a generator by a transmission to transfer energy generated by the hygroscopic material as it expands and/or contracts from exposure to moisture and/or humidity. In accordance with some embodiments of the invention, the hygroscopic material can be adhered to a flexible surface or enclosed in an expandable container. In these embodiments, the addition of moisture causes the hygroscopic material to expand resulting in the flexing of the flexible surface in a first direction or expansion of the container and the removal of moisture causes the hygroscopic material to contract resulting in the flexing of the flexible surface in a second direction or contraction of the container. The motion and forces generated by the expanding or contracting hygroscopic material can be converted to electrical energy using a generator.

In accordance with one embodiment of the invention, the hygroscopic material can be adhered to a flexible sheet material that includes a piezo electric material or is coupled to a piezo electric device, for example by a transmission. The hygroscopic material can be exposed to a plurality of cycles composed of a low relative humidity environment followed by a high relative humidity environment causing the hygroscopic material to release moisture and shrink and then absorb moisture and expand. The resulting expansion and contraction caused the piezo electric material or the piezo electric device to generate electricity.

In accordance with an alternate embodiment of the invention, the hygroscopic material can be used to vary the space and area of a dielectric material separating two plates of a capacitor. The plates can be formed from a flexible conductive material and separated by one or more layers of hygroscopic material or a dielectric elastomer material. The plates can be biased with a voltage potential and the hygroscopic material can be exposed to a plurality of cycles composed of a low relative humidity environment followed by a high relative humidity environment causing the hygroscopic material to release moisture and shrink and then absorb moisture and expand. The shrinking and expanding of the hygroscopic material can cause the distance between the plates and/or the area of the plates to change, resulting in a change in capacitance and generating electricity.

In accordance with a further embodiment of the invention, the hygroscopic material can be used in a device that stores energy. The hygroscopic material can be placed in an enclosed, expandable container that is compressed. As long as the hygroscopic material remains sealed away from moisture, the device will store energy. To release the energy, water or moist air can be introduced into the container causing the hygroscopic material to absorb moisture and expand causing the container to expand releasing the stored energy. A plurality of energy storage devices can be combined to enable the generation of larger quantities of energy. The energy storage devices can be coupled to an energy conversion device for converting the mechanical energy to electrical energy.

These and other capabilities of the invention, along with the invention itself, will be more fully understood after a review of the following figures, detailed description, and claims.

BRIEF DESCRIPTION OF THE FIGURES

FIGS. 2a and 2b show images of the (2a) front and (2b) back sides of a silicon AFM cantilever with spores immobilized on the back side. The RH of the air surrounding the cantilever was periodically cycled every 5 seconds. FIG. 2c shows a graph of the change in surface stress over time and FIG. 2d shows a graph of the relative change in mass over time. FIG. 2e shows a graph of the change in surface stress over time where the cycle period was reduced to 2 seconds. FIG. 2f shows a graph of the surface stress after 1 million cycles at the 2 second period.

FIGS. 3a-c show photographs of a rubber sheet at 30%, 60%, and 90% RH. FIG. 3d shows a graph of the radius of curvature (circles) and the plane stress (squares) as function of RH. FIG. 3e shows a graph of free energy as function of RH.

FIGS. 4a-e show a system for generating electricity according to one embodiment of the invention. FIG. 4a shows the curved rubber sheet (beige) fixed to a Lego™ brick (yellow) with adhesive tape (black). FIGS. 4b-c show the rubber sheet placed against a piezoelectric transducer wherein, when an ultrasonic humidifier provides moisture, the spores swell and the rubber sheet pushes against and deforms the transducer to generate electricity. FIG. 4d shows the voltage waveform recorded during three cycles of high and low RH of the system of FIGS. 4b-c. FIG. 4e shows the electrical energy delivered to the 10 M ohm input resistance of an oscilloscope probe.

DETAILED DESCRIPTION OF PREFERRED EMBODIMENTS

Figure 1A:
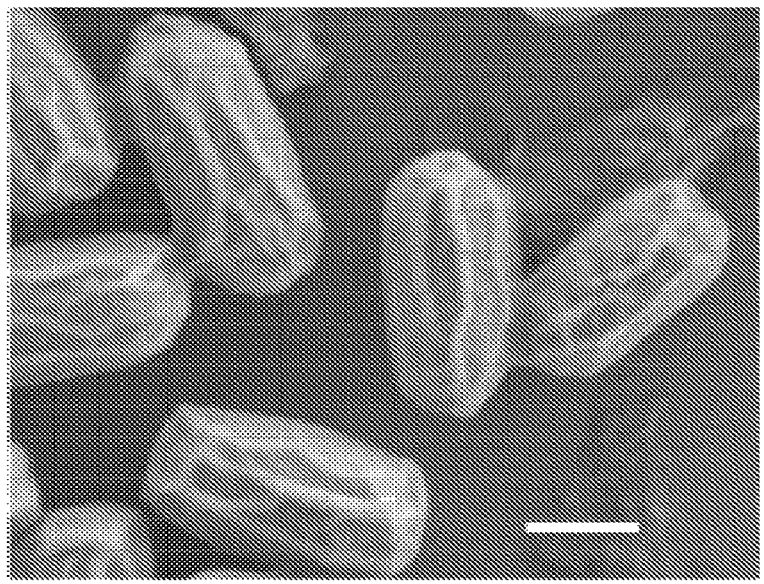
FIG. 1A shows a scanning electron microscope image of B. subtilis spores, the scale bar represents 500 nm.

The present invention is direct to methods and systems for generating and storing energy using hygroscopic materials, such as bacterial spores. Hygroscopic material includes microbial spores, such as spores of spore forming bacteria, preferably non-pathogenic strains from the bacillus genus, such as, Bacillus atrophaeus, B. subtilis, B. cereus, B. megaterium, B. thuringiensis, B. stearothermophil and Gram-positive bacterial spores, plant cells and plant cell materials (including plant walls), and silk materials. Other Hydroscopic materials can include cell-free extracts from spores, plant tissues, synthetic biomimetic hygroscopic gels, hydrogel based materials, such as pHEMA [Poly(2-hydroxyethyl methacrylate)], Polyacrylamide, detergent-containing 'cytoskeletal stabilization' buffers, and hyaluronic acid based polymer based materials. In accordance with the invention, the hygroscopic material such as bacterial spores can be arranged in various configurations and exposed to varying environmental conditions that enable the spores to absorb or evaporate moisture. Upon absorbing moisture, the spores expand and upon releasing moisture, the spores contract. As a result, the spores in the various configurations can be made to generate energy and do work. The spores, can be coupled using one or more transmission elements to a generator to convert the mechanical energy, for example, into electrical energy.

In addition, the hygroscopic materials, after being exposed to water or moisture, can be exposed to an evaporating environment, such as low RH or heating or low pressure environment that causes moisture to be released from the material and causes the material shrink, substantially back to its original size when dry. Sources of heat can include natural and artificial sun light, as well as other natural and artificial heat sources, including hot springs, geothermal heat sources, and heat released by power plants and other industrial equipment or vehicles.

In accordance with the invention, the exposure to or application of high relative humidity environment includes the direct application of a fluid, including water, water vapor and high relative humidity gases, including air and the exposure to or application of low relative humidity environment includes the direct removal of water and water vapor, for example, by lowering the vapor pressure and/or heating and the application of low relative humidity gases, including air.

In accordance with various embodiments of the invention, the hygroscopic material can be coupled to a transmission that transfers the forces and energy generated by the expanding and contracting hygroscopic material to a generator that converts the forces into energy, such as electrical energy. In some embodiments, the transmission can be a mechanical linkage of one or more components, including for example, levers and/or gears. In other embodiments, the transmission can include an arm or sheet material that is coupled to the hygroscopic material (using, for example, an adhesive material) such that it flexes in response to the changing volume or shape of the hygroscopic material. The arm or sheet can be connected to or coupled to a generator to produce energy. The transmission can be adapted, for example, using levers and/or gears, to change the speed and/or force of actuation. The transmission can also include one or more hydraulic or pneumatic elements and can be adapted to change the speed or force of actuation by varying the cross-sectional area of the fluid or gas flow. The generator can, for example, be an electromagnetic generator which converts mechanical energy to electrical energy or a solid state device, such as piezo-ceramic transducer which converts mechanical energy to electrical energy. In other embodiments, the generator can be a capacitor that changes its capacitance in response to the expanding and contracting hygroscopic material that forms part of the dielectric of the capacitor. Dielectric elastomer based generators can also be used. In this embodiment, the hygroscopic material can be coupled to the dielectric elastomer so that changes in the size of the hygroscopic material changes the capacitance across the dielectric elastomer. See, for example, FIG. 11D.

Figure 1B:
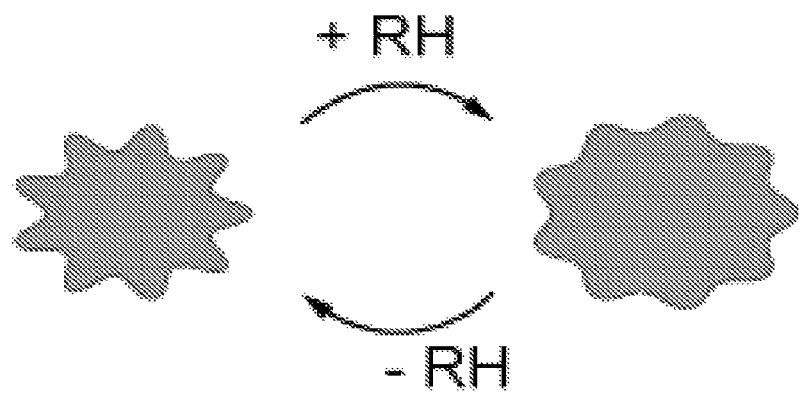
FIG. 1B shows a diagram of the spore hydration/swelling-dehydration/shrinking cycle, according to the invention.
Figure 1C:
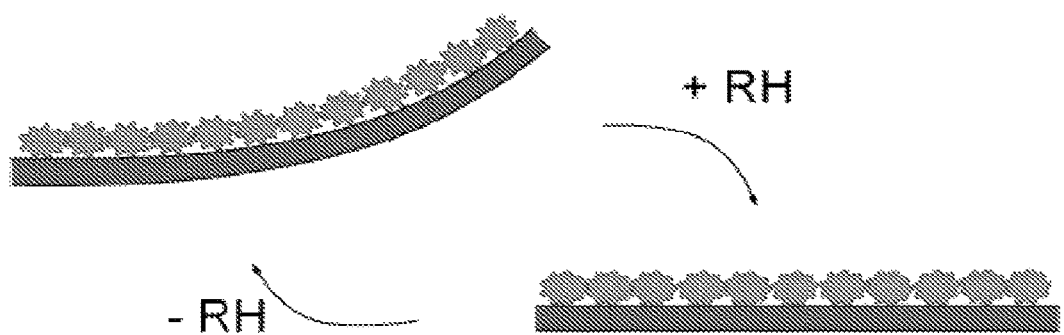
FIG. 1C shows a diagram of a system for using spores to generate energy to deform a sheet of flexible material, according to one embodiment of the invention.

In accordance with one embodiment of the invention, bacterial spores can be physically adhered to a sheet of elastic material, drying spores contract anisotropically and reduce their radius (FIG. 1*a*), a process that is reversible on humidification (FIG. 1*b*). The induced differential strain causes the sheet to curve (FIG. 1*c*), generating mechanical work. FIG. 1A shows a scanning electron microscope image of *B. subtilis* spores. The scale bar represents 500 nm. FIG. 1B shows a diagram of the reversible process of humidification and dehumidification that causes the spores to swell and then shrink. FIG. 1C shows a diagram of spores densely adhered to an elastic sheet material. Upon drying the spores contract transferring mechanical energy to the sheet causing it to curl. If the spores are initially fixed in placed in the contracted state, with the application of moisture, the spores expand transferring mechanical energy to the sheet causing it to curl in the opposite direction.

To demonstrate the dynamics of force generation, water absorption/release, and the response of spores to long term cyclical expansion and contraction in a system, *B. subtilis* spores can be placed on the surface of an atomic force microscope (AFM) cantilever, as shown in FIGS. 2*a* and 2*b*, and subjected to changes in relative humidity (RH). This system can be used to measure the changes in surface stress from the deflection of the cantilever and the mass of the absorbed water vapor from the shifts in the resonance frequency.

In this embodiment, an AFM cantilever chip (Veeco Instruments, HMX-S) was gently placed on a flat piece of silicon wafer while the cantilever stayed in contact with the surface of the wafer. A solution of spores (~1 mm in diameter) in water was pipetted onto the cantilever under an optical microscope and allowed to dry. The cantilever surface was inspected by optical microscopy to ensure that spore coverage of its surface. The cantilever was placed into the AFM head (Veeco Instruments, Multimode AFM) with the uncoated side of the cantilever facing the laser beam.

In order to provide a system for rapid switching of relative humidity, an aquarium pump was used to supply two streams of air travelling through plastic tubing. One of the streams was saturated with water vapor by passing it through a bubbler. The other stream carried laboratory air at approximately 15-20% relative humidity. The open ends of the tubes were placed near the AFM head with air flowing towards the cantilever. A motorized arm was used to block the air from the tubes one at a time, switching at the frequency of a square wave supplied by a signal generator. The RH levels experienced by the cantilever were determined by first recoding the cantilever deflection signals at high and low RH levels in this setup and then by placing the AFM head in a controlled humidity chamber to find the steady RH levels that give the same signal values.

Measurement of changes in plane stress and mass of the cantilever were determined as follows: The plane stress σ at the surface of an elastic substrate with thickness t, Young's modulus E, and Poisson's coefficient ν is related to the radius of curvature r according to Stoney's formula:

$$\sigma = \frac{E}{6(1-\nu)}\frac{t^2}{r} \tag{1}$$

This formula provides a good approximation if the film generating stress is significantly thinner than the substrate so that the bending stiffness of the film is negligible. While the thickness of the spore layer is comparable to the cantilever, we assumed that it has a negligible bending stiffness because it is composed of objects with approximately circular cross sections. A more general treatment of curvature can be found in Reyssat, E. & Mahadevan, L. Hygromorphs: from pine cones to biomimetic bilayers. *J. R. Soc. Interface* 6, 951-957 (2009) which is hereby incorporated by reference. The AFM allows measurement of the slope of the cantilever at the location of the laser spot, rather than measurement of the radius of curvature. However, r can be related to the slope θ if the position of the laser spot relative to the cantilever base x is known. Assuming a parabolic profile for the cantilever, the radius is: r=x/θ. The changes in the slope near the free end of the cantilever were measured to be well beyond the detector limits (saturation); therefore we placed the laser spot close to the cantilever base. The exact position of the laser spot was estimated by comparing the ratio of the thermal noise levels at this location and at a location near the free end of the cantilever, using the analytical expression for the mode shape of a rectangular cantilever beam. Thickness of the cantilever was determined to be 1.49 um from the spring constant. Young's modulus and Poisson's coefficient were selected to be E~130 GPa and ν~0.278 for silicon (100). The effect of the reflective aluminum coating (40 nm) was neglected and it was assumed the entire cantilever is made of silicon.

The change in cantilever mass was determined by its effect on the resonance frequency, which is described by the equation $\omega^2=k/m$. Here ω is the resonance frequency, k is the cantilever spring constant, and m is the total mass of the cantilever. For relatively small changes in mass;

$$\Delta m/m=2\Delta\omega/\omega \tag{2}$$

To make rapid measurements of the shifts in the resonance frequency, the cantilever was driven at a constant frequency near the resonance and then monitored the phase of oscillations. Phase is related to the resonance frequency according to the formula $$\varphi = \tan^{-1}\frac{\omega_d\omega/Q}{\omega_d^2-\omega^2} \tag{3}$$

Here $\omega_d$ is the drive frequency and Q is the quality factor of the resonance. For the cantilever used for the measurements, $\omega_d$ was chosen as 12.15 KHz and Q was determined to be 48. Once a phase value was measured, Eq. (3) was used to find the resonance frequency and Eq. (2) was used to find the change in mass relative to its value at the lowest RH. Note that the total mass of the cantilever includes the dry mass of spores (650 nm thick, 1.5 g/cm$^3$, circular cross section) and the silicon (1.49 μm thick, 2.33 g/cm$^3$, uniform cross section).

Figure 2A:
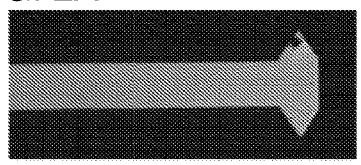
FIGS. 2a-f show the dynamics of spore expansion and contraction according to one embodiment of the invention.
Figure 2B:
Figure 2C:
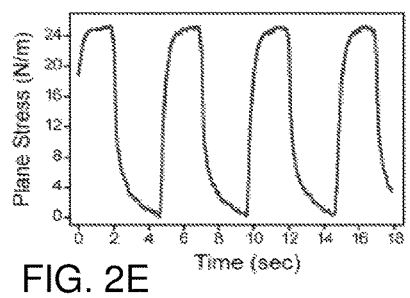
Figure 2D:
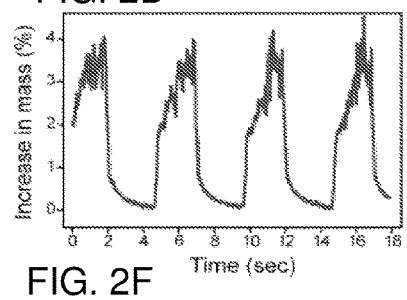

In accordance with one embodiment, the RH can be cycled between 15% and 85% at a predefined period, in this example, 5 seconds, and the spores expanded and contracted generating a plane stress of 25.2 N/m, as shown in FIG. 2c. During this process, the total mass of the cantilever changed by 3.5% from the dry state (15% RH) to the hydrated state (85% RH) as shown in FIG. 2d. Considering the density and thickness of the silicon cantilever, the spore layer absorbed and released ~0.15 g/m$^2$ of water. On a flat surface this much water would be expected to create a thickness of 150 nm.

As shown in FIG. 2c, the spores respond in ~0.4 seconds during water absorption and ~0.5 seconds during water release. This relatively fast response is useful for energy applications because power levels from a unit area of material directly depend on the rate of evaporation and absorption and the associated rates of contraction and expansion. The measured timescale for drying (~0.5 sec) and the effective thickness of water released in the process (150 nm) correspond to an evaporation rate of ~300 nm/sec. This is larger than the rate of natural evaporation that is generally below 2 meters per year (~63 nm/sec). Interestingly, the measured rates of water absorption and release by the spores are also sufficient to respond to the fluctuations in moisture caused by respiration, which occurs on a time scale of ~1 sec.

Figure 2E:
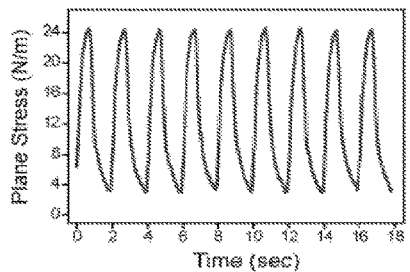
Figure 2F:
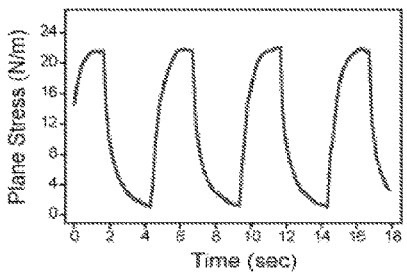

To understand the effect of long term cyclical absorption and release of water on the kinetics of shape change, the period of cycles was reduce from 5 seconds to 2 seconds and the spores were allowed to go through more than 1 million cycles over the course of 6 weeks (FIG. 2e). The variations in the strain response reduced only slightly after this period of time (FIG. 2c, f), highlighting the remarkable reversibility of the swelling and shrinking process even over many cycles.

Energy Transfer to an External Load

In the above analysis, spores induced a strain of 0.04% and displaced the free end of the 300 μm long cantilever by 18 μm. While this represents a remarkable actuation capability in the context of micromechanical devices, the strain induced and the energy transferred to the substrate can increase significantly with a proper choice of substrate material and thickness. To understand the conditions that maximize energy transfer, we used a simple estimate for the maximum strain in a bilayer plate. For a given ratio of the elastic modulus of the passive sheet to the spore layer, there is an optimum ratio of thicknesses that maximizes the energy transfer, leading to a simple design criterion for optimizing these dynamic spore-based hygromorphs as energy harvesters that correspond to an optimal range of the elastic modulus and thickness corresponds to millimeter thick rubber sheets. Consequently, we prepared samples by placing spores on natural latex rubber sheets.

Figure 3A:
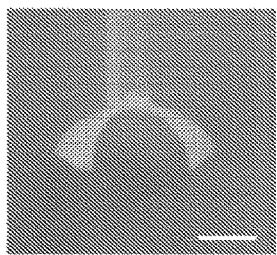
FIGS. 3a-e show the application of energy to a flexible material according to one embodiment of the invention.
Figure 3B:
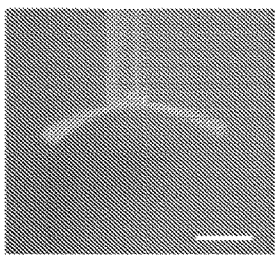
Figure 3C:
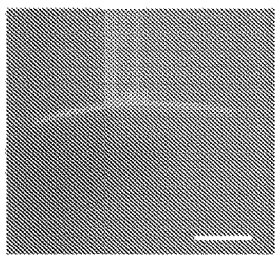
Figure 3D:
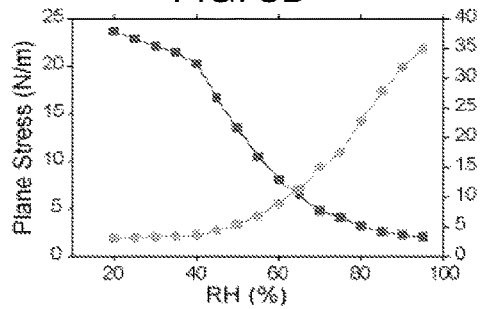
Figure 3E:
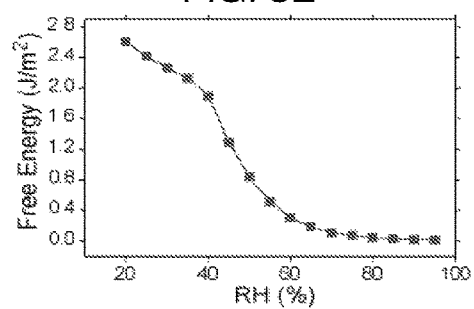
Figure 7A:
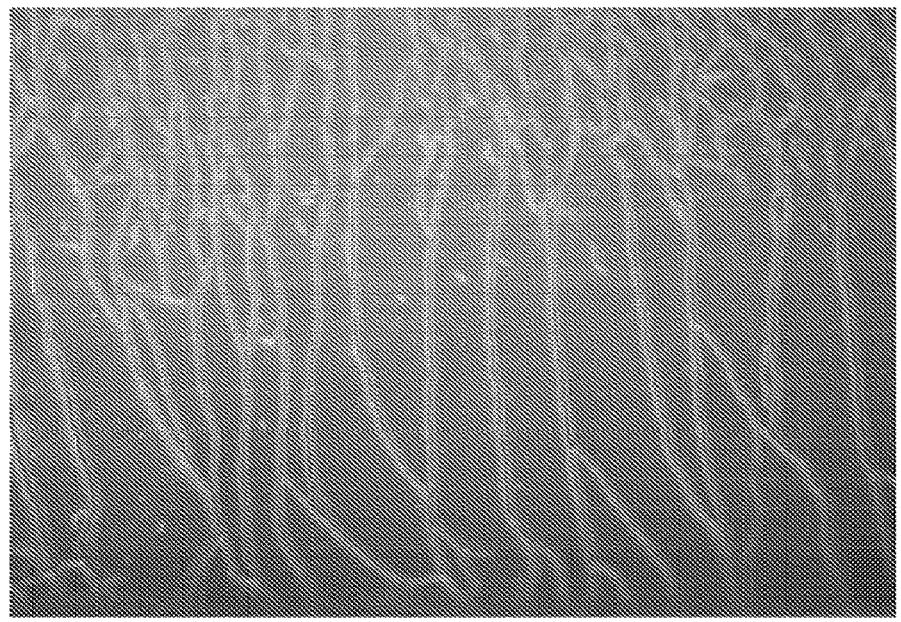
FIGS. 7A and 7B show photographs of crack formation in the spore layer.
Figure 7B:
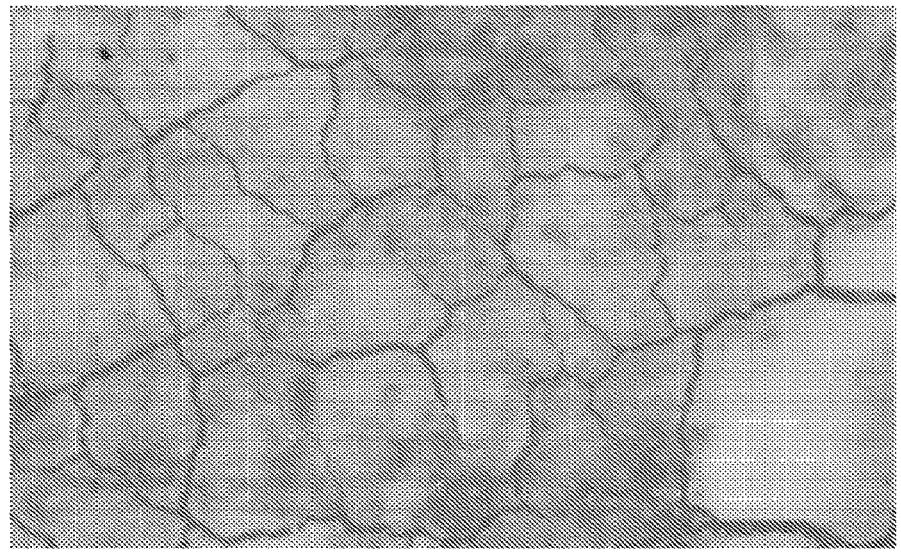

FIG. 3a-c shows the changes in the shape of a 0.5 mm thick natural latex rubber sheet induced by a layer of bacterial spores at varying levels of RH. The sheet is allowed to deform in a horizontal plane to minimize the effect of gravity. From the observed radii of curvature we determined the strain generated by the spores (FIG. 3d) and the free energy available for useful work (FIG. 3e). At 20% RH, the measured strain of 10.9% corresponds to a stress of 23.7 N/m and produces ~2.6 J/m$^2$ free energy available for useful work. This corresponds to a work density of ~4 J/cm$^3$ (assuming a thickness of 650 nm for the spore layer), which is higher than typical work densities achieved by artificial muscles by an order of magnitude, suggesting the possible use of spores as actuators. The energy density can be even higher. For example, while a similar amount of work can be generated from both spatial directions, cracks in the spore layer that are largely parallel to the short axis of the rubber sheet restricted the transfer of energy to one dimension (FIGS. 7A and 7B).

In principle, spores that contracted and equilibrated at low RH can also generate work when they expand in saturated (high RH) air. If two sources of air are available, one saturated and one at low RH, spores can cyclically absorb water from the saturated air and release it at low RH, while converting ambient heat into useful work. The maximum work that can be done in this process is determined by the changes in the free energy of the water being transferred: $w = R_g T \ln(\rho)$, where w is the molar work, $R_g$ is the gas constant, T is the temperature and $\rho$ is the RH of air. According to the AFM based measurements of the mass of the absorbed water (~0.15 g/m$^2$), the maximum work that can be done in one cycle is approximately 32 J/m$^2$ at 20% RH. Assuming that the energy converting device based on spores can collect energy from the displacements in two directions and equal amounts of work can be done in expansion and contraction, the spore layer should be able to generate ~10.4 J/m$^2$ of work per cycle. This represents an efficiency of approximately 30%. The efficiency can be improved by strengthening the adhesion between the neighboring spores, thereby preventing crack formation and increasing the plane stress values. In addition, the expansion and contraction of spores in the third direction transfers water without generating work. This leakage effect can be mitigated by blocking the expansion of spores in that direction.

In one embodiment, natural latex rubber sheets (Rubber Sheet Roll, Shippensburg, Pa.) were cut into rectangular pieces with scissors. Their top surfaces were treated with poly-1-lysine to improve adhesion. A solution containing *B. subtilis* spores was placed on pieces of rubber sheet and then allowed to dry in a fume hood. RH of the laboratory air was approximately 15-20%. The amount of solution to be placed on the rubber sheet was determined by visually inspecting spore coverage under an optical microscope. Once the solution dried, the rubber sheets already exhibited a curvature because the RH of laboratory air was low (~15-20%). The sheets were then placed in a chamber with saturated air and kept for a day. This procedure increased the curvature of the rubber sheets once they were placed back to low RH.

The rubber sheet, 0.5 mm thick, was cut into a 2 cm by 6 cm rectangular piece and coated with a layer of spores. The sheet was attached from the center to a piece of acrylic glass with adhesive tape and then placed vertically in a humidity chamber with transparent walls. RH inside the chamber was monitored with a hygrometer (Vaisala). The chamber RH was gradually increased from the laboratory level (~18% at the time of the measurements) by supplying saturated air. Photographs of the latex sheet were taken from a direction allowing the 2 cm wide edge to be seen. Pictures were taken at intervals of 5% RH starting from 20%.

The plane stress at the spore layer was determined according to the formula:

$$\sigma_x = \frac{Et^2}{6(1-\nu^2)}\left(\frac{1}{R_x} - \nu\frac{1}{R_y}\right) \qquad (4)$$

Here $\sigma_x$ is the surface stress along the direction of the observed curvature, E is the Young's modulus of the rubber, $\nu$ is the Poisson's coefficient for rubber, t is the thickness of the rubber sheet, and $R_x$, $R_y$ are the radii of the curvature. t is 0.5 mm for the sheet used in FIG. 3. $R_x$ is estimated by fitting the optical pictures of the rubber with a circle. $R_y$ is assumed to be infinite because the rubber sheet exhibited a cylindrical shape. Strain at the surface of the rubber sheet near the spores is estimated from $2t/3R_x$ (the neutral plane is $2t/3$ below the surface, see also Eqs. 2.3-2.6 of Reyssat, E. & Mahadevan, L., above. We determined E from the stress strain curves for a rectangular strip of the same latex rubber sample (1.3 MPa). $\nu$ is taken as 0.5. Note that in contrast to Eq. (1), Eq. (4) accounts for anisotropic stresses in the spore layer. The cylindrical geometry of the rubber sheet originated during the spore drying. This shape was stable. Although bifurcations observed in bilayer systems with large deformations may explain the emergence of a cylindrical shape, we observed formation of cracks in the spore layer that are largely parallel to the short axis of the sheet (see FIG. 7B). This suggests that stresses, originating along the receding capillary during the sample preparation, were larger than the strength of adhesion between the spores.

Design Principles for Maximum Energy Transfer to an Elastic Substrate

The contracting spore layer exerts a plane stress at the interface between spores and the substrate. As a result, the substrate shape deforms into a curved surface (FIG. 6). The relationship between the radius of curvature r and plane stress σ is given with the following formula:

$$\sigma = \frac{E}{6(1-\nu)}\frac{t^2}{r} \tag{1}$$

Here E is the Young's modulus, ν is the Poisson's coefficient, and t is the thickness of the elastic substrate. In the resulting curved geometry, the strain within the elastic substrate varies linearly with distance. The neutral plane with zero strain is located 2t/3 away from the spore-substrate interface. Therefore, the strain s at the interface is given by $$s = \frac{2t}{3r} \tag{5}$$

FIG. 6 shows a schematic of an elastic substrate coated with a layer of bacterial spores deformed by the stress generated by the spores.

Using s, we can rewrite Eq. (1) as follows:

$$\sigma = \frac{Et}{4(1-\nu)}s = Ks \tag{6}$$

Eq. (6) provides the plain stress-strain relationship dictated by the elastic substrate. Strain within the spore layer provides a second relationship. Precise modeling of this relationship is complicated by the complex geometries of spores and their arrangements on the surface. For simplicity, we assume the following linear relationship:

$$\sigma = M(s_{dry} - s) \tag{7}$$

Here M is the modulus of stretching, $s_{dry}$ is the strain induced in unconstrained spores upon drying, and s is given by Eq. (5). Note that $s_{dry}$ has a negative value and for $s_{dry}<s<0$, plane stress σ is also negative. Equations (6) and (7) can be solved to find equilibrium stress $\sigma_0$ and strain $s_0$ values.

$$\sigma_0 = \frac{MK}{M+K}s_{dry}, \quad s_0 = \frac{M}{M+K}s_{dry} \tag{8}$$

The energy transferred to the substrate during the drying process can be written in terms of the equilibrium stress $\sigma_0$ and strain $s_0$ values as follows:

$$W = \int_{s=0}^{s_0} \sigma(s)\,ds = \frac{1}{2}\sigma_0 s_0 = \frac{1}{2}\frac{M^2K}{(M+K)^2}s_{dry}^2 \tag{9}$$

This equation is maximized when K is equal to M. The modulus of stretching M is the product of the effective thickness h and the effective elastic modulus $E_h$ of the spore layer. Therefore, the condition of maximum energy transfer becomes:

$$E_h h = \frac{E_s t}{4(1-\nu)} \tag{10}$$

To estimate the value of the left hand side of Eq. (10), we measured elastic moduli of the spore coat and the underlying cortex layer with atomic force microscopy and found them to be 13.6 GPa and 6.9 GPa, respectively. To measure the elastic modulus of the cortex, we analyzed a cotE-gerE mutant of *B. subtilis*, which lacks most of its coat. The cortex is very likely to be the layer that most readily absorbs water and swells. Therefore, we approximate $E_h$ with 6.9 GPa. The bacterial spore layer has an approximate thickness of 650 nm (typical diameter of *B. subtilis* spores). However due to their round shaped cross sections, spores do not make physical contact in the entirety of the 650 nm. To account for this geometrical effect, we assumed h~300 nm.

According to Eq. (10), for a given substrate material with elastic modulus $E_s$, maximal energy transfer to the substrate takes place at some specific thickness. In addition, the conditions for maximum energy transfer (K=M) also require $s_0$ to be $s_{dry}/2$ (See Eq. (8)). For spores $s_{dry}$ can be as much as 12%. Therefore, materials that cannot sustain large strains are not suitable for maximizing energy transfer. In this work we used natural latex rubber sheets, which have $E_s$~1.3 GPa and ν~0.5. Then, according to Eq. (10) the thickness of the rubber sheet should be 3.15 mm.

Electricity Generation with Spores

To demonstrate the generation of electricity with bacterial spores, we used a commercially available piezoceramic (PZT) transducer. For this, we fixed one edge of a spore-coated rubber sheet and allowed the opposite edge to slide against the surface of the piezoelectric plate (FIG. 4*a-c*). The mechanical coupling was limited by the large bending stiffness of the piezoelectric plate relative to the rubber sheet (>$10^4$). Nonetheless, it was possible to generate a potential difference of 1.4 volts (FIG. 4*d*) and deliver approximately 1.4 μJ of electrical energy in one cycle of high and low RH (FIG. 4*e*).

Despite the limited mechanical coupling and frictional losses, the electrical power generated by the changing relative humidity compares favorably against energy harvested from ultrasonic vibrations, suggesting that interfacing with spores may improve the power output of piezoelectric nanogenerators. Nevertheless, economically feasible generation of electrical energy requires high efficiency electromechanical conversion. A developing technology based on dielectric elastomers shows significant promise for low cost high efficiency electromechanical conversion. These materials are basically thin sheets of elastomers, such as silicone, coated with compliant electrodes. When external mechanical forces cyclically stretch and contract the elastic sheet, the changes in the capacitance between the electrodes allow converting mechanical energy into electricity. Theoretical work has shown that dielectric elastomers have a capacity to generate electrical energy of more than 2 Joules per gram of the elastomer in one cycle of stretching and contraction. In principle, spores can be assembled on dielectric elastomers, resulting in potentially low cost and scalable rubber-based devices.

Figure 8:
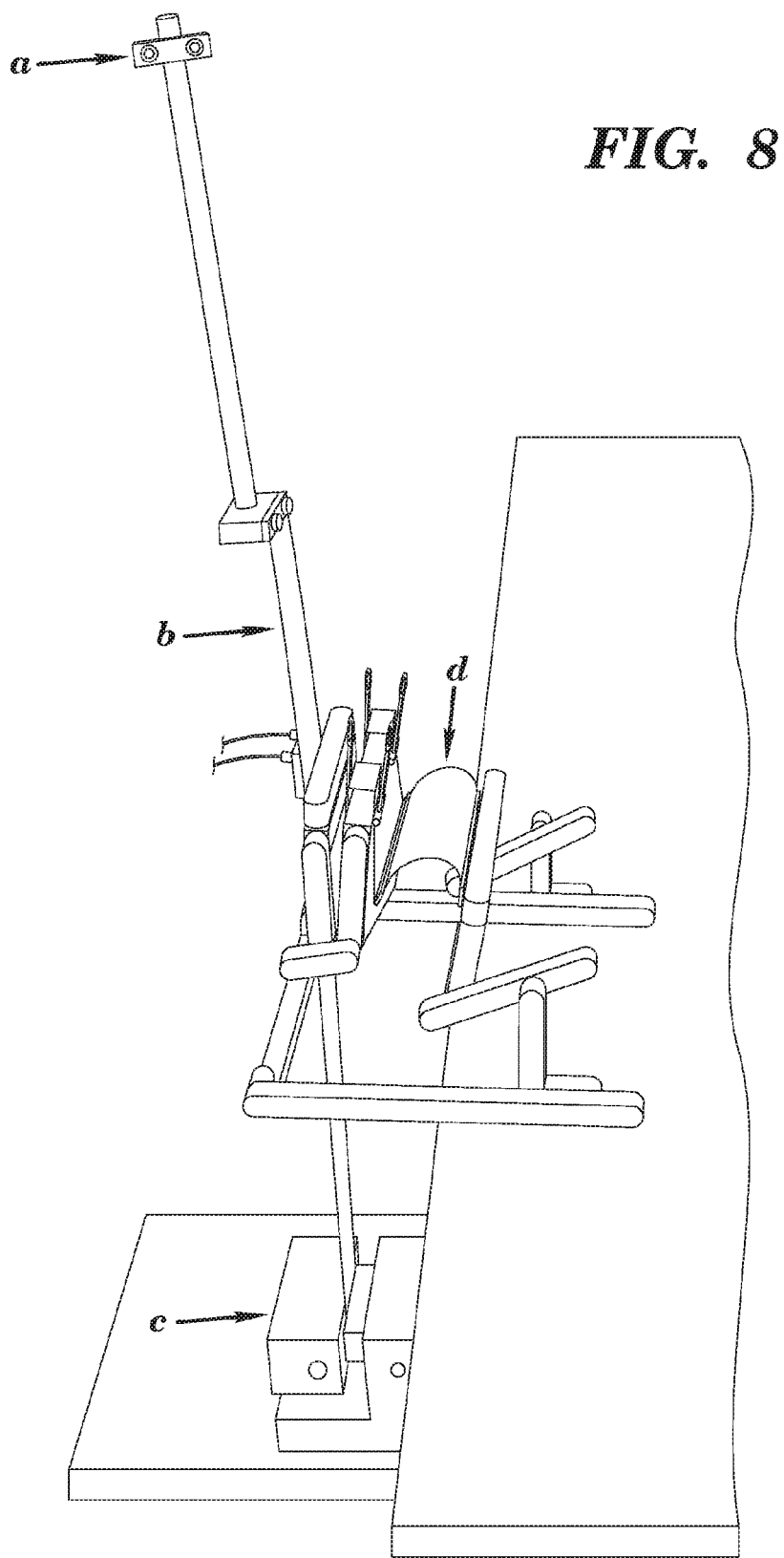
FIG. 8 shows a photograph of a system for generating electricity according to an embodiment of the present invention.
Figure 9:
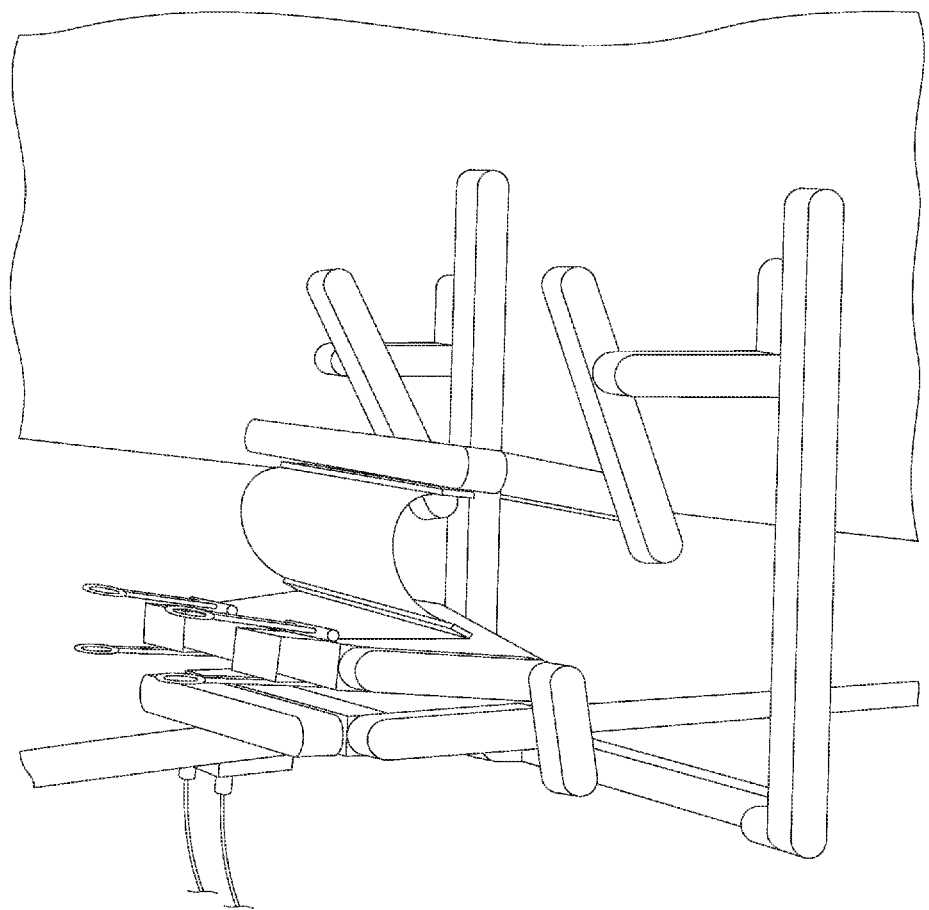
FIG. 9 shows a close-up photograph of the system of FIG. 8 for generating electricity according to an embodiment of the present invention.

Electricity can be generated by placing the rubber sheet in contact with a piezoelectric transducer assembly as shown in FIG. 8. Four piezoelectric transducers (Piezo Systems, inc. Part no: D220-A4-503YB; 0.38 mm thick, 31.4 mm wide, and 62.5 mm long, with Young's modulus ~50 GPa) were attached in a row and the whole assembly was positioned vertically, like an inverted pendulum. In FIG. 8, b is the top most piezoelectric transducer and c is the base that holds the stack of piezoelectric transducers in position. Additional mass a was placed at the top with a slider that allowed us to change the height of the mass a, and therefore, the effective spring constant. A 0.625 mm thick latex rubber sheet d, 3 cm by 8 cm in size, was coated with a layer of $B.$ $subtilis$ spores. The sheet d was brought into physical contact with the piezo assembly so that only the 8 cm long edge of the rubber sheet d touched the piezo material. The opposite edge of the rubber sheet d was fixed to a Lego™ brick. Moisture was generated by an ultrasonic humidifier (Vicks). See FIGS. 8 and 9. Moist air from the humidifier was guided through a plastic hose and brought to the vicinity of the rubber sheet. RH surrounding the rubber sheet d was increased or decreased by moving the open end of the hose close to or away from the sheet d. Voltage generated from the piezoelectric transducers connected in series was recorded with a data acquisition card (National Instruments, S-6115) using a 10× oscilloscope probe.

Note that there is large difference in bending stiffness of the piezoelectric material and the rubber sheet. Consequently, the effective spring constant of each piezoelectric transducer (~188 N/m, when fixed at one end) is significantly higher than the effective spring constant of the rubber sheet (~0.03 N/m, in the flexure mode). The large mismatch in mechanical properties leads to low mechanical coupling. The piezo assembly used here has a lower effective spring constant that improves energy transfer from the spore coated rubber sheet.

Figure 5:
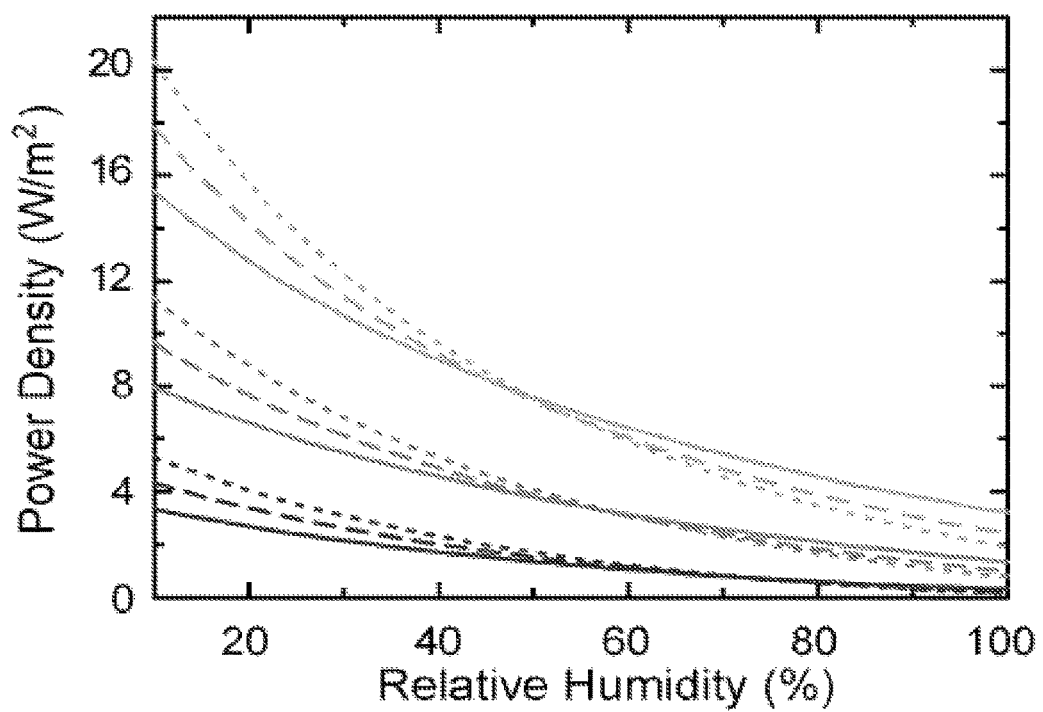
FIG. 5 shows a graph of power density as a function of RH which can be obtained from systems according to the present invention.
Figure 6:
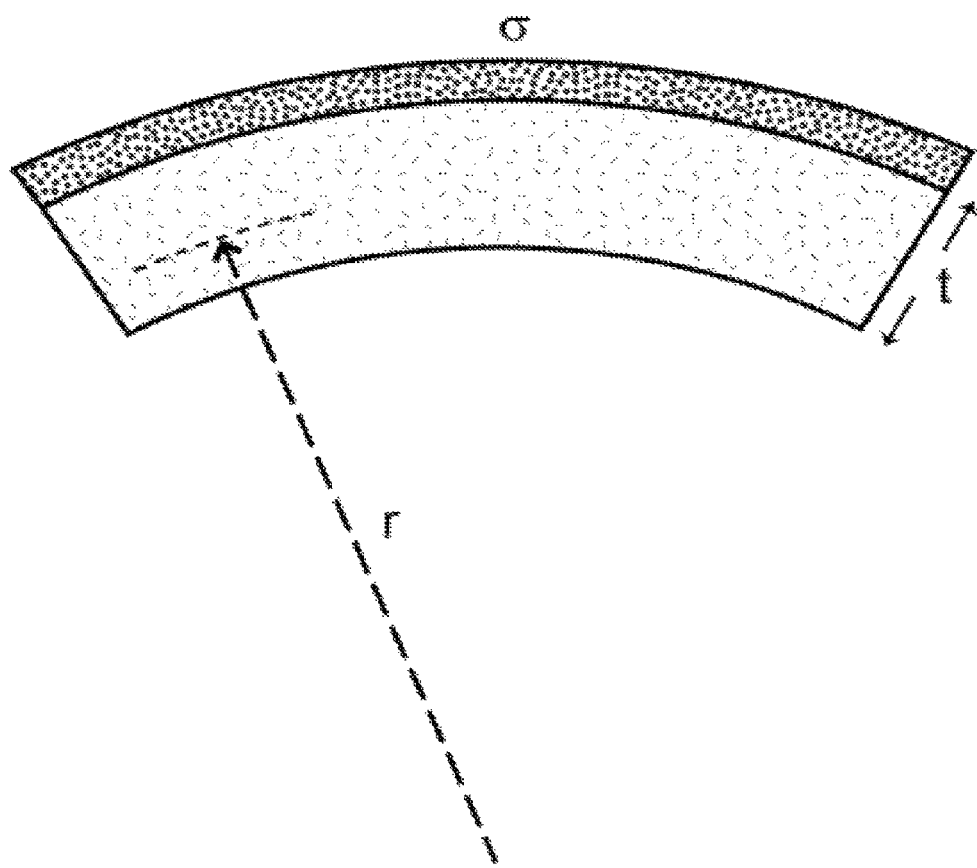
FIG. 6 shows a schematic diagram of an elastic substrate coated with a layer of bacterial spores deformed by stress generated by the spores according to one embodiment of the present invention.

FIG. 5 shows the areal density of power generation from natural evaporation under conditions representative of cold, mild and warm weather. Depending on the wind speed, air temperature, relative humidity, and solar radiation, 1-20 W/m² of power output can be expected. In FIG. 5, the power extracted from a unit area of evaporating water is plotted as a function of surface relative humidity ρ for weather conditions of 200 W/m² net solar radiation, 18° C. air temperature, and 10 km/h wind speed at 5 values of the RH of air. Power densities at optimal ρ values are plotted for cold (blue/bottom; 6° C., 100 W/m²), mild (green/middle; 18° C., 200 W/m²), and warm (orange/top; 30° C., 300 W/m²) weather. Calculations are carried out for three wind speeds, 10 km/h (solid line), 20 km/h (dashed line), and 30 km/h (dotted line).

The power density levels in FIG. 5 are comparable to the power densities delivered by existing wind and solar farms, which are around 1-10 W/m². Achieving this power density will require engineering of devices that fully harness the potential of bacterial spores. If this can be implemented in platforms like dielectric elastomers, then the cost of energy production could be economically feasible.

Both elastomers and bacterial spores are produced in large quantities and used in a variety of industries. Bacterial spores also have the important advantage that several species (including the one used in this study) are environmentally benign and pose no health risk to humans or other animals. Biological materials with strong hygroscopic properties, such as plant cell walls and spider silk, are potential alternatives to spores in our proposed technology. However, spores are particularly attractive because of the ease with which they can be produced and built into devices, their high work density and durability over a wide range of conditions and large numbers of cycles of dehydration.

Figure 10A:
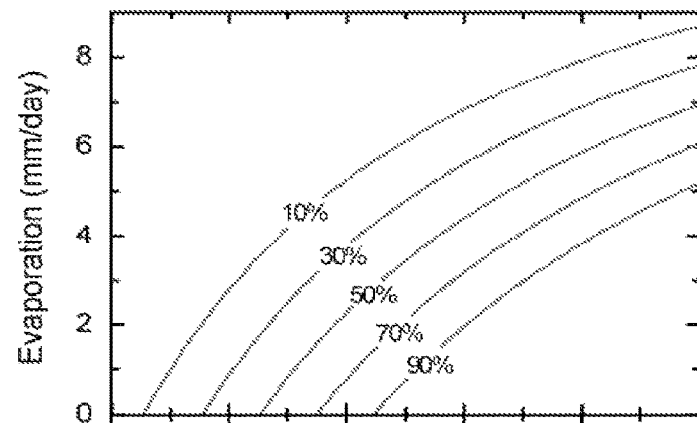
FIG. 10 shows graphs of evaporation rates (10a), surface temperature (10b) and power density (10c) calculated as a function of surface RH for a system according to the present invention.
Figure 10B:
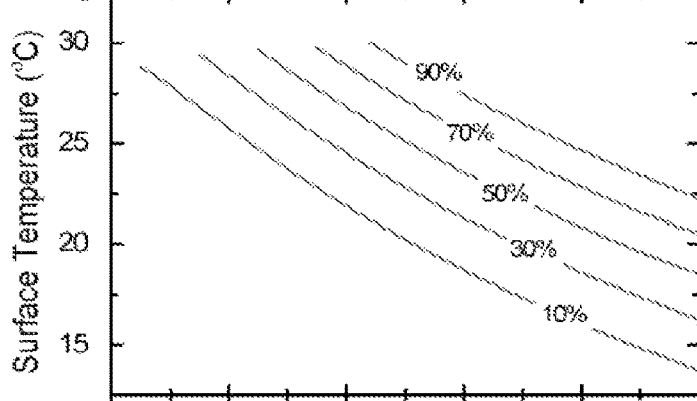
Figure 10C:
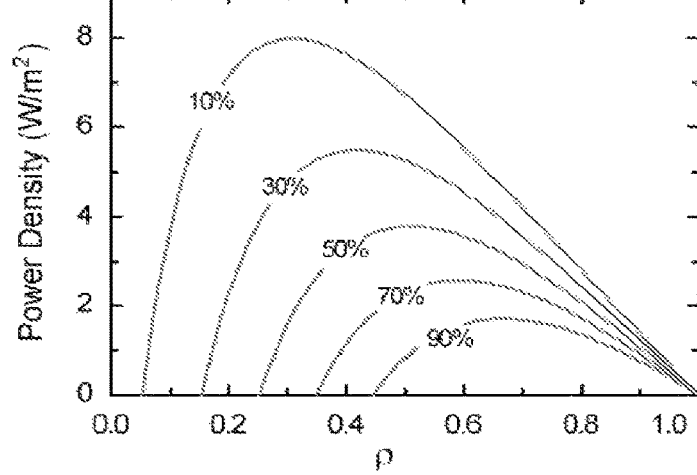

We have calculated the evaporation rate, surface temperature, and the power that is extracted from evaporation as a function of the surface relative humidity ρ and for a range of the relative humidity of air. Note that ρ is a variable that can be controlled by the energy converting devices, which can be tuned to a desired value by adjusting the load w. FIG. 10a shows evaporation rates calculated for 200 W/m² net solar radiation, 18° C. air temperature, and 10 km/h wind speed at 5 values of RH. As ρ is lowered from unity (w=0), the rate of evaporation gradually declines and the surface temperature rises (FIG. 10b). Evaporation ultimately vanishes at a certain value of ρ, at which point heat is transmitted back to air entirely in the form sensible heat. Importantly, the amount of power extracted from evaporation peaks at certain values of ρ (FIG. 10c). For a given weather conditions, the load on the energy converting devices can be adjusted to maximize the power output. In addition, evaporation rates at optimal values of ρ are approximately half of the open water evaporation rates (ρ=1) under the same weather conditions.

EXAMPLES

In accordance with one embodiment of the present invention, one or more layers of bacterial or other spores can be adhered or coupled to the surface of a piezoelectric material or a piezo polymer, for example as shown in FIG. 2a. The spores can be cyclically exposed to high RH and low RH air as described above causing the spores to expand and contract and causing the piezoelectric material or piezo polymer to generate electricity.

The piezo materials can be used in an energy conversion device formed from an otherwise unstable structure (this can be a mechanical instability like an inverted pendulum, buckling beam, etc). The coupling helps to bring the overall spring constant of the entire device to near zero. A near zero spring constant means the system has near zero stored mechanical energy. This will ensure highly efficient electricity generation.

Figure 11A:
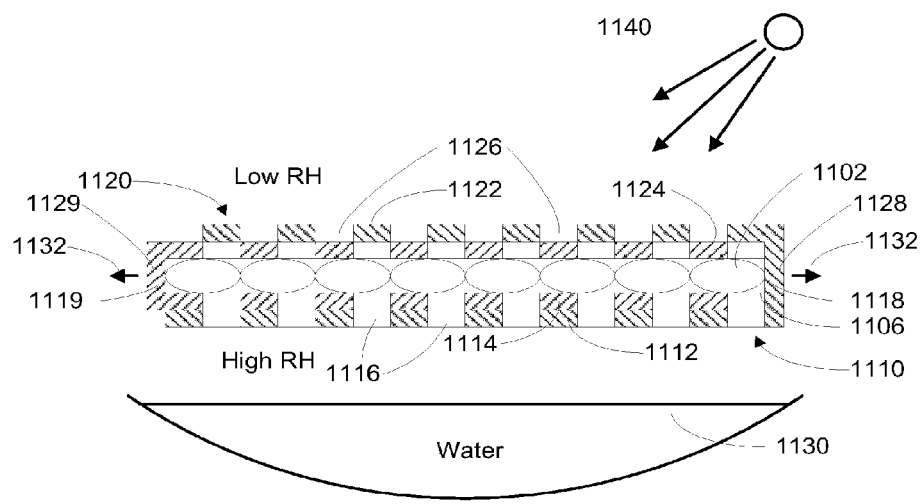
FIGS. 11A and 11B show a device for generating energy having a shutter for controlling the exposure to high and low RH environments according to the invention.
Figure 11B:
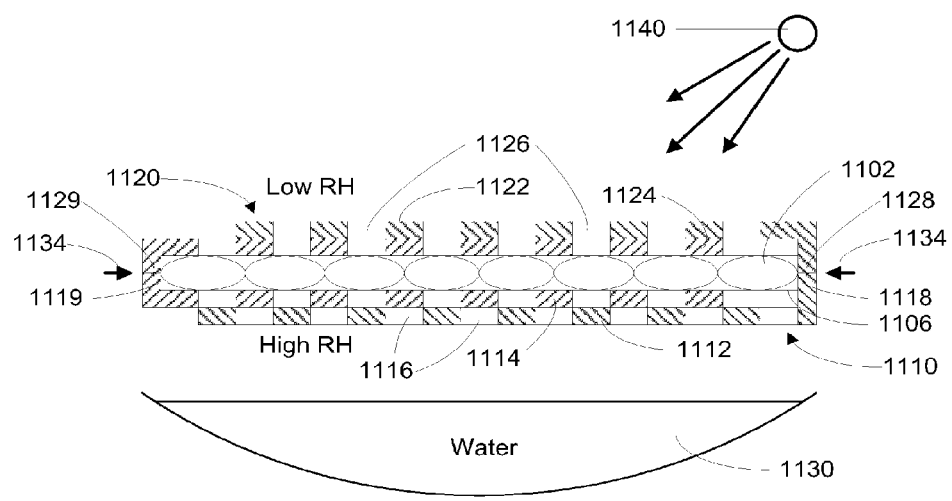
Figure 11C:
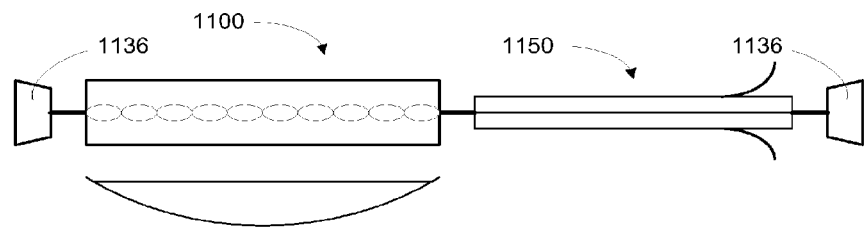
FIGS. 11C-11E show systems based on the embodiments of FIGS. 11A-11B for generating electrical energy according to the invention.
Figure 11D:
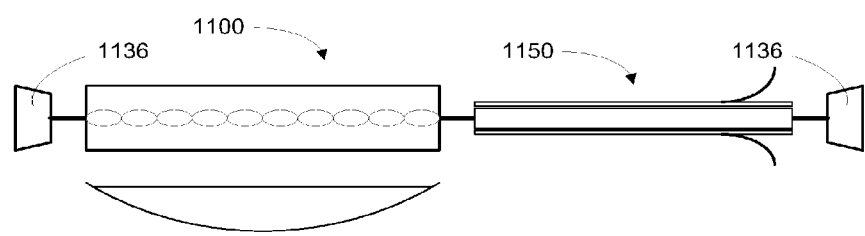
Figure 11E:
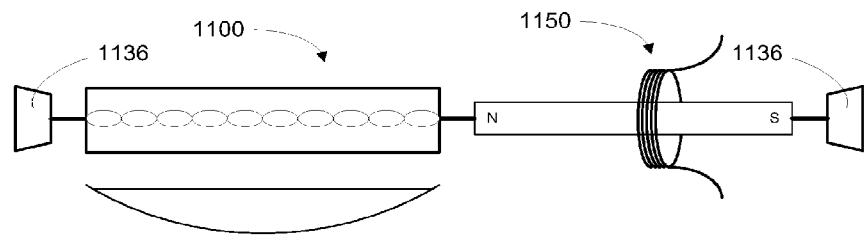
Figure 12A:
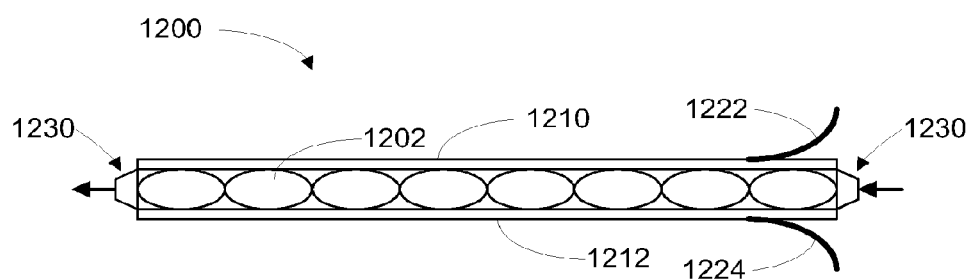
FIGS. 12A-12D show a device for generating electrical energy using bacterial spores according to the invention.
Figure 12B:
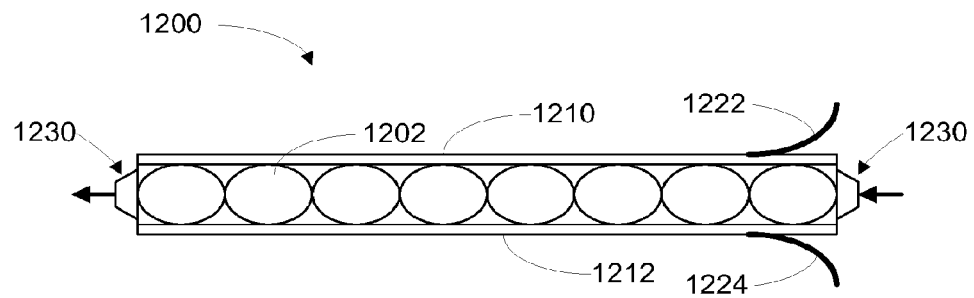
Figure 12C:
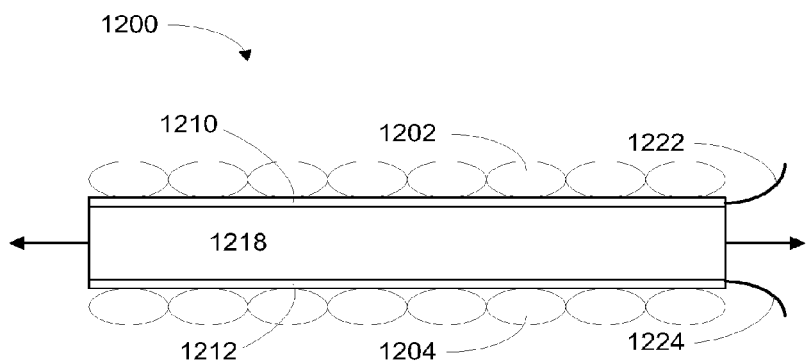
Figure 12D:
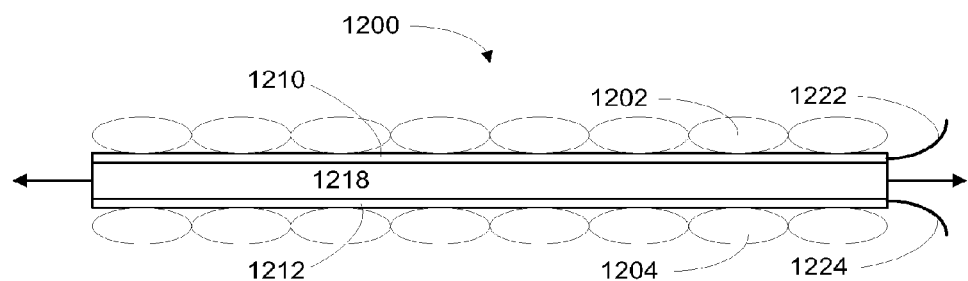

In an alternative embodiment, the spores can be embodied in a system that periodically exposes the spores to high RH and low RH environments as shown in FIGS. 11A and 11B. The system shown in FIGS. 11A and 11B includes a plurality bacterial spores 1102 arranged in one or more layers, encapsulated in an expandable container 1106 that translates the expansion of the spores 1102 into linear expansion of the container in one or more dimensions. Preferably, the container 1106 is constructed from a flexible material and allows for moisture to pass into the container 1106 to be absorbed by the spores 1102 and for moisture released by the spores 1102 to pass out of the container 1106. For example, the container 1106 can be formed from a flexible mesh material. In addition, the container 1106 can include a bottom shutter mechanism 1110 covering the bottom surface and top shutter mechanism 1120 covering the top surface of the expandable container. Each shutter mechanism 1110, 1120 can include two overlapping plates 1112, 1114, 1122, 1124 having a plurality of evenly spaced slots 1116, 1126 such when the plates can move relative each other in a first direction the slots 1116, 1126 become either aligned and open or not aligned and closed (blocked by the material between the slots of the other plate). One end of each plate 1118, 1119, 1128, 1129 of the shutter mechanism can be fastened to or engage opposite ends of the container 1106 such that as the container expands the plates of the shutter mechanism move relative to each other.

In operation, the spores 1102 can be dry and contracted in the expandable container 1106. The bottom shutter mechanism 1110 in this initial state is configured such that the slots 1116 are aligned and moisture from the body of water 1130 below can easily enter the container 1106. In this initial state, the top shutter mechanism 1120 can be configured such that the slots 1126 are not aligned and closed, so moisture cannot easily escape the container 1106. From this initial state, moisture enters the container 1106 from below and the spores 1102 begin to swell causing the container 1106 to expand horizontally as indicated by the arrows 1132. As the container 1106 expands the top plate 1122 of the top shutter mechanism 1120 and the bottom plate 1112 of the bottom shutter mechanism 1110 move in an opposite direction to the bottom plate 1124 of the top shutter mechanism 1120 and the top plate 1114 of the bottom shutter mechanism 1110, causing the slots 1116 in the bottom shutter mechanism 1110 to close and the slots 1126 in the top shutter mechanism 1120 to open such that the system reaches the expanded stated as shown in FIG. 11B. In the expanded state, the top shutter mechanism slots 1126 are open exposing the spores 1102 to a low RH environment causing the spores 1102 to release moisture and contract causing the contain 1106 to contract horizontally as indicated by arrows 1134 and return to the initial state. Optionally, heat from a heat source 1140, such as from the Sun or an artificial heat source, can be applied to increase the release of moisture. The process then repeats.

Naturally occurring evaporation can be powered by the sunlight. When some of the light gets reflected from the surface, that power is not used in evaporation. To maximize the use of solar energy for evaporation, the materials in the vicinity of the hygroscopic material can be constructed from black colored materials or light absorbing materials or nanoparticles.

FIGS. 11C-11E show alternative systems for producing electricity from the device shown in FIGS. 11A-11B. In accordance with one embodiment of the invention as shown in FIG. 11 C, the linear expanding and contracting device 1100 of FIGS. 11A-11B can be coupled by one or more transmission elements or links to a piezo electric device 1150 and the opposite ends of the system can be coupled to fixed anchor points 1136. The system generates electricity by applying expanding and contracting forces on the piezo electric device which converts the mechanical energy to electrical energy.

Similarly, as shown in FIG. 11 D, the linear expanding and contracting device 1100 of FIGS. 11A-11B can be coupled by one or more transmission elements or links to a capacitive device 1150 formed from dielectric elastomer as described below with respect to FIGS. 12C and 12D and the opposite ends of the system can be coupled to fixed anchor points 1136. This system generates electricity by expanding and contracting the dielectric elastomer that serves as the dielectric material between two plates of a capacitor.

Similarly, as shown in FIG. 11 E, the linear expanding and contracting device 1100 of FIGS. 11A-11B can be coupled by one or more transmission elements or links to an electric generator device 1150 formed from a permanent magnet and one or more coils of wire and one end of the device can be coupled to fixed anchor points 1136. This system generates electricity by applying the expanding and contracting motion to move a permanent magnet relative to a coil of wire to produce electricity. Alternatively, the linear motion can be converted to rotary motion to rotate the drive shaft or a rotary generator.

In an alternative embodiment of the invention, the spores according to the invention can be used to change the distance between plates that form a capacitor. The spores expand to increase the distance between the plates and decrease the capacitance and then the spores contract to decrease the distance between the plates and increase the capacitance. In an alternate embodiment, the spores contract to increase the distance between the plates and decrease the capacitance and then the spores expand to decrease the distance between the plates and increase the capacitance.

Dielectric electroactive polymers (dielectric elastomers) can be used to produce an electric generator. Dielectric elastomers (DE) are thin rubber dielectric sheets that can be coated with flexible/compliant electrodes to form a capacitor. Stretching the dielectric elastomer increases the area of the plates and decreases the space between the plates (and vice versa) to convert mechanical energy into electricity. Their operation is simple and they can run for millions of cycles.

FIGS. 12A and 12B show a hygroscopic material such as bacterial spores 1202 attached directly to the DE 1210 and 1212. When DE 1210, 1212 is biased to a voltage, it can act as an electricity generator. The expansion and contraction of the hygroscopic material 1202 will create electricity. As shown in FIGS. 12A and 12B, the system 1200 looks like a flexible sheet with wires 1222 and 1224 coming from it. The wires 1222 and 1224 feed in the electrical bias voltage and take out the generated electrical energy. A small battery (such as a thin film battery) can also be used for initial bias. This flexible sheet can be formed with multiple layers where the inner layer has the hygroscopic material and the outer layers control water blockage and transmission.

In an alternative embodiment, the system 1200 can include one or more ports 1230 which can be used to pump humid air and alternately dry air between the DE layers to hydrate and dehydrate the hygroscopic material.

FIGS. 12C and 12D show an alternate embodiment of the invention in which a layer of hygroscopic material, such as bacterial spores 1202, is fixed to a conductive elastic material that serves as the first plate of a capacitor. The capacitor includes a second plate also formed from a conductive elastic material separated by a dielectric elastomer material. Optionally, a second layer of hygroscopic material, such as bacterial spores, can be fixed to the second plate. In operation, as the hygroscopic material absorbs moisture and expands causing the plates and the dielectric elastomer material to expand. Linear expansion of the dielectric elastomer causes it to reduce its thickness resulting in a capacitor with a larger plate area and smaller gap between, increasing the capacitance of the capacitor. When the device 1200 contracts, the plate area is reduce and the distance between the plates increases, resulting in a decrease in the capacitance of the capacitor. Leads 1222 and 1224 can be used to apply a bias potential voltage and allow for the generated AC voltage to drawn from the system during expansion and contraction cycles.

In an alternative embodiment, the device can be constructed from a material, such as a sheet material that is adapted to block the passage of water or water vapor on demand. To create cycles of water absorption and release, the surface that is close to high RH can be configured to block the water vapor and the hygroscopic material will dry. After a predefined time period, the water blocking can be reversed allowing the hygroscopic material to absorb water vapor and expand.

In a further embodiment, the device can be constructed to allow the hygroscopic material to be exposed to the natural, daily variation in RH. Thus, over the course of a day, the natural variation in RH can be sufficient in come locations and environments to cause the expansion and contraction of device according to the invention.

In an alternative embodiment, the hygroscopic material can be adhered or coupled to a rotating surface and rotated through a high RH environment and a low RH environment. When the hygroscopic material is rotated into the high RH environment, it will absorb water and expand and when the hygroscopic material is rotated into the low RH, it will dry and contract.

In accordance with one embodiment of the invention, systems containing hygroscopic materials such as bacterial spores can be used to construct energy storage systems. In accordance with this embodiment an expandable container of spores can be dried and compressed to store energy. As long as the spores in the container are sealed to prevent water and moisture from entering the container, the energy can be stored for long periods of time. To release the energy, a seal can be broken or a port opened allowing moist air or water to be introduced into the container. The spores will absorb the water and expand causing the container to expand. The container can be coupled to a mechanical device that converts the energy to electricity or a compressed fluid.

Figure 13A:
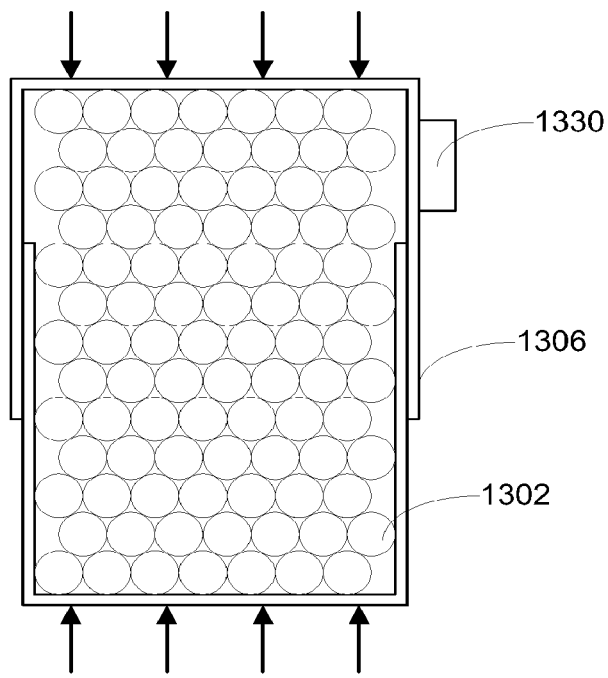
FIGS. 13A-13B show a device for storing energy using bacterial spores according to the invention.
Figure 13B:
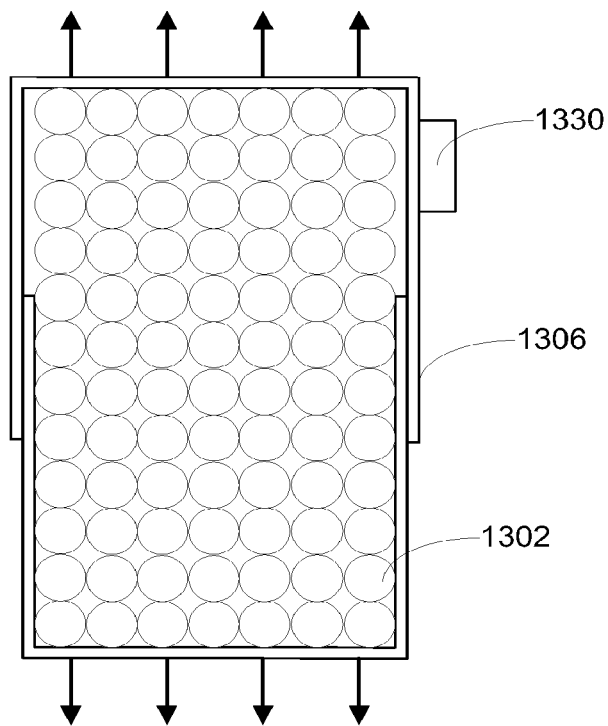

FIGS. 13A and 13B show a system 1300 for storing energy. The system can include an expandable container 1306 filled with a plurality of spores 1302 (or other hygroscopic material). As shown in FIG. 13A, the container can be compressed as shown by the arrows, packing the spores in the container 1306. A port 1330 can be provided to on the container to allow air and moisture to be evacuated from the container as it is compressed. This will allow the system store energy over a wide range of temperatures and prevent expansion in cool environments that could cause condensation inside the container 1306. When energy is needed, the port 1330 can be opened and water or humid air can be injected into the container causing the spores and the container to expand as shown by the arrows in FIG. 13B. Each container 1306 can be designed to produce a predefined amount of energy and a plurality of containers 1306 can be combined to produce a predefined amount of energy.

Figure 14A:
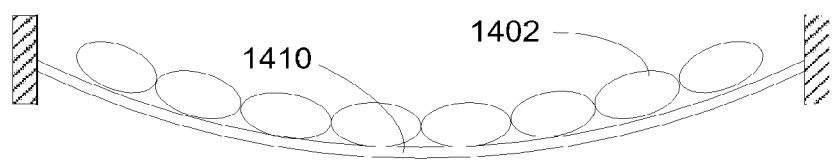
FIGS. 14A-14B show a device for generating energy using bacterial spores according to the invention.
Figure 14B:
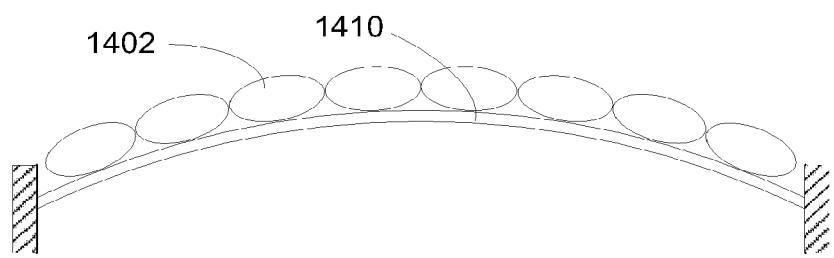

FIGS. 14A and 14B show a system 1400 for storing and generating energy. In this embodiment, the hygroscopic material, such as bacterial spores 1402, can be fixed to a pre-stressed material, such as plate 1210. The plate 1210 can be pre-stressed in to the position shown in FIG. 14B and then biased in to the position shown in FIG. 14A, such as by exposing the hygroscopic material 1402 to a low RH environment causing the material to contract. In this configuration, the device 1400 can act as an energy storage device. In operation, the hygroscopic material 1402 can be exposed to water or a high RH environment causing the material to expand and causing the plate 1210 to move to the position shown in FIG. 14B.

In alternative embodiments of the invention, the hygroscopic material can be exposed to moisture absorbing (e.g., high RH) and evaporating (e.g., low RH) environments by moving or rotating the device through these environments. In still further embodiments, the device can be configured to expand and contract based on naturally occurring variations in environment or a combination of natural and artificial produced environmental conditions.

In accordance with the invention, the spore (or other hygroscopic materials) are available or can be produced in various shapes and sizes. In sheet form, each layer of spores can be arranged in one or more predefined geometric, pseudo random and random patterns that can be optimized for energy storage and generation as well as to allow water or humid air to enable the spores quickly and efficiently be absorbed by the spores. Further, the spores can be arranged and oriented to produce predictable expansion or contraction along predefined dimensions.

Further, the description refers to bacterial spores, however other types of spores and hygroscopic materials can be used. As one of ordinary skill would appreciate, different spores or materials can be selected based on their properties and the desired energy release and expansion.

Other embodiments are within the scope and spirit of the invention.

Further, while the description above refers to the invention, the description may include more than one invention.

What is claimed is:

1. A system for generating energy comprising:
  a hygroscopic material;
  a generator;
  a transmission coupled to the hygroscopic material and coupled to the generator to transfer energy from the hygroscopic material to the generator;
  whereby a cycle of high relative humidity environment and low relative humidity environment is selectively applied to the hygroscopic material and results in an expansion and contraction of the hygroscopic material and energy being transferred to the generator; and,
  wherein the selectively applied cycle of high relative humidity environment and low relative humidity environment is caused by the expansion and contraction of the hygroscopic material.

2. The system according to claim 1 wherein the hygroscopic material includes microbial spores.

3. The system according to claim 1 wherein the hygroscopic material includes bacterial spores.

4. The system according to claim 1 wherein the hygroscopic material is adhered to a surface of flexible material layer.

5. The system according to claim 1 wherein the hygroscopic material is contained within an expandable container.

6. The system according to claim 1 wherein the hygroscopic material is part of a dielectric material in a capacitor.

7. The system according to claim 1 wherein the generator includes an electro-magnetic generator that produces electricity in response to the expansion and contraction of the hygroscopic material.

8. The system according to claim 1 wherein heat applied to the hygroscopic material causes the hygroscopic material to contract.

9. The system according to claim 1 wherein a low pressure environment applied to the hygroscopic material causes the hygroscopic material to contract.

10. The system according to claim 1, wherein the selectively applied cycle of high relative humidity environment and low relative humidity environment results from selectively exposing the hydroscopic material to a body of water to produce the high relatively humidity environment and blocking said exposure to the body of water to produce the low relatively humidity environment.

11. A method of generating energy comprising:
providing a hygroscopic material;
providing a transmission coupling the hygroscopic material to a generator;
selectively applying a cycle of high relative humidity environment and low relative humidity environment to the hygroscopic material resulting in an expansion and contraction of the hygroscopic material,
whereby the transmission transfers energy associated with the expansion and contraction of the hygroscopic material to the generator and the generator produces energy; and,
wherein the selectively applied cycle of high relative humidity environment and low relative humidity environment is caused by the expansion and contraction of the hygroscopic material.

12. The method according to claim 11 wherein the hygroscopic material includes microbial spores.

13. The method according to claim 11 wherein the hygroscopic material includes bacterial spores.

14. The method according to claim 11 wherein the hygroscopic material is adhered to a surface of flexible material layer.

15. The method according to claim 11 wherein the generator includes an electro-magnetic generator that produces electricity in response to the expansion and contraction of the hygroscopic material.

16. The method according to claim 11 further comprising applying heat to the hygroscopic material and causing the hygroscopic material to contract.

17. The method according to claim 11 further comprising applying a low pressure environment to the hygroscopic material and causing the hygroscopic material to contract.

18. The method according to claim 11, wherein the selectively applied cycle of high relative humidity environment and low relative humidity environment results from selectively exposing the hydroscopic material to a body of water to produce the high relatively humidity environment and removing said exposure to produce the low relatively humidity environment.

* * * * *